Oct. 24, 1950     M. KOFFLER     2,527,364
MACHINE FOR THE RECOVERY OF ESSENTIAL OIL
CONTAINED IN THE PEEL OF CITRUS FRUIT
Filed Dec. 6, 1947

Inventor
Maximilian Koffler
By George Benjamin
Attorney

Patented Oct. 24, 1950

2,527,364

UNITED STATES PATENT OFFICE 2,527,364

MACHINE FOR THE RECOVERY OF ESSENTIAL OIL CONTAINED IN THE PEEL OF CITRUS FRUIT

Maximilian Koffler, Tel Aviv, Palestine

Application December 6, 1947, Serial No. 790,162
In Palestine May 19, 1947

2 Claims. (Cl. 146—3)

1

The essential oils contained in the vesicles of the flavedo of citrus fruit are recovered by opening these vesicles, subjecting the fruit to a water spray and finally separating the oil from the water. The vesicles are opened by manually operated rasping devices or by mechanically rotated cylinders. In the latter case the cylinders are provided on their circumference with pins or the like pointed protuberances which during the rotation of the cylinders bruise the flavedo of the fruit which is passed by gravity or otherwise from one end of the cylinders to the other end. Hereby the membranes of the vesicles are pierced and disrupted. Two cooperating cylinders or several pairs of such cylinders have been used, the fruit being caused to travel along the cylinders from one end to the other end thereof, and in the case of several pairs of cylinders in a serpentine way from one pair to a succeeding one. In order that the fruit is rasped all around, the cylinders, if there is one pair only, should be of considerable length. On the other hand, in case of several parallel pairs used, the pairs must be separated from each other by partition walls to prevent the fruit from jumping from one pair onto the other prior to completing its way along the whole length of one pair of cylinders.

According to the present invention, several relatively short horizontal piercing cylinders or rollers are provided, but these cylinders are arranged with their axes in a more or less ascending plane. The fruit moves across the cylinders, in contradistinction to the known movement along the cylinders. All cylinders rotate in the same direction, they are of the same diameter and rotate with the same circumferential speed, so that their pins only pierce the vesicles without slitting and removing the skin of the fruit and the fruit fed to the lowermost cylinder is caused to climb upwards to the higher cylinders by the pins or protuberances of the cylinders and also by being pushed forward by the fresh fruit fed to the lowermost cylinder from an inclined chute, the inclination of the latter being inversely directed to the slope of the plane of the cylinders. Said slope may vary between about 5–15° depending upon the weight of the fruit and on the results obtained by experience.

Figure 1:
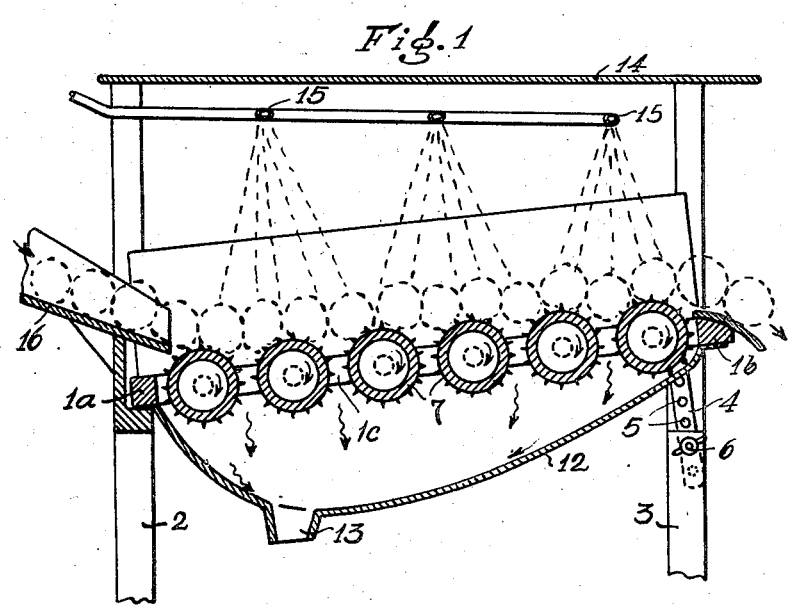
Figure 2:
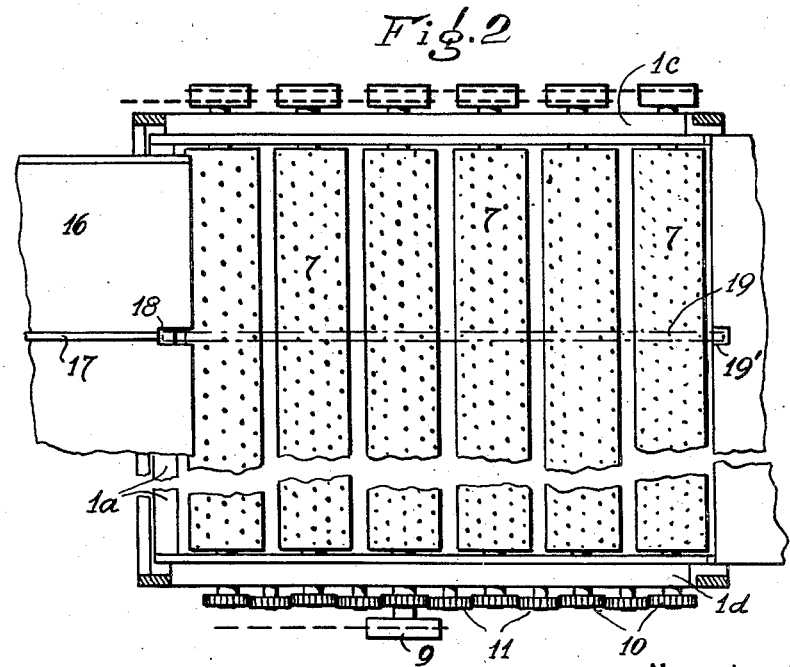

The invention is illustrated by way of example and in a schematical manner in the annexed drawing, wherein Fig. 1 represents a vertical section,
Fig. 2 a plan view of the new machine.

A four-sided quadrangular frame rests at two opposite sides 1a, 1b, on standards or supports 2, 3. Support 3 is higher than support 2, links or stays 4 of an adjustable length being interposed between support 3 and frame 1 by means of which the inclination of the frame can be changed. The links 4 are provided with several holes 5 any one of which can be engaged by a horizontal pin 6 provided on support 3. Link 4 can of course be substituted by some other common device for raising the frame 1, e. g. some screw-bolt, turnbuckle or the like. Side 1a is pivotally attached to support 2.

In the two other opposite sides 1c, 1d of the frame are journalled, in parallelism to and slightly spaced from each other, cylinders or rollers 7 of equal diameter provided on their circumference with pins adapted to pierce and disrupt the vesicles of the flavedo containing the essential oil. On the ends of the axles of the cylinders projecting out of the side 1c of the frame are keyed belt pulleys 8 (see Fig. 2 upper part) for driving all cylinders in the same direction and with the same circumferential speed. For the same purpose there may be fastened a belt pulley 9 on one axle only (see lower part of Fig. 2) and the movement be transmitted to the other axles by means of spur gears 10 of equal diameter fixed on them, and intermediate gears 11. To the underside of the frame is fastened a trough 12 with an opening 13 in its bottom. On the sides 1c, 1d of the frame is erected a vaulted roof 14 open at the sides 1a, 1b of the frame 1. Underneath the roof 14 are arranged several nozzle pipes 15 adapted to direct water sprays onto the cylinders 7. In front of the machine there is arranged a chute 16 reaching to the lowermost cylinder 7 and inversely inclined to the plane of the cylinders. The chute is divided by walls 17 into several parts, through all or some of which the fruit can be fed down to the said lowermost cylinder. In the lower edge of the chute 16 are cut out incisions 18 in prolongation of the partition walls 17, corresponding incisions 19' being provided in the side 1b. A board 19 can be inserted on edge in any of the incisions 18 and in an opposite incision 19' in side 1b of the frame.

The machine operates as follows: The fruit is supplied to the chute 16 in any appropriate way wherefrom it slides down to the lowermost of the rotating cylinders 7. The pins of the latter pick up the fruit penetrating its skin, and carry the fruit upwards towards the next higher cylinder, which on its part feeds the fruit to the yet higher cylinder and so on until the fruit falls down from the last and highest cylinder. This upward trend of the fruit across the cylinder is assisted by the pressure exerted by the fruit sliding down the chute on the fruit already on the cylinders. While the fruit is thus pulled and pushed upwards it is also rotated around its centre and is all round pierced. During the transport of the fruit across the cylinders the open vesicles are washed out by the water-spray and the mixture of water and oil is collected in the trough 12, wherefrom it is drained off for further treatment in the known manner. For fruit of a lighter weight the frame will be given a greater inclination than for a fruit of a heavier weight. If the machine built for a certain output is to be used for a smaller output it is advisable to insert the partition wall 19 and to allow the fruit to pass over the cylinders only on the right or left side of this wall.

What I claim is:

1. In a machine for the recovery of the essential oil contained in the peel of citrus fruit, a series of cylinders provided with pins for opening the vesicles of the flavedo of the fruit and arranged horizontally and parallel to each other with their axes in an ascending plane, means for driving all cylinders in the direction of the ascent with equal circumferential speed, a chute inclined in a direction inverse to the inclination of the ascending plane for feeding the fruit to the lowermost cylinder, and at least one partition wall extending at an intermediate position between the ends of, and across the cylinders from the lowermost cylinder to the uppermost one to maintain an output relationship governed by the pressure exerted by the fruit sliding down the chute on fruit already on the cylinders, the partition wall cooperating with the layer of fruit to retain the flow of the fruit under the pressure of the fruit sliding down the chute.

2. In a machine for the recovery of the essential oil contained in the peel of citrus fruit, a series of cylinders provided with pins for opening the vesicles of the flavedo of the fruit and arranged horizontally and parallel to each other with their axes in an ascending plane, means for driving all cylinders in the direction of the ascent with equal circumferential speed, at least one partition wall extending substantially medially across the cylinders from the lowermost cylinder to the uppermost one, and a chute inclined in a direction inverse to the inclination of the ascending plane for feeding the fruit to the lowermost cylinder divided by partition walls into feeding compartments to maintain an output relationship governed by the pressure exerted by the fruit sliding down the chute on fruit already on the cylinders, the partition wall cooperating with the layer of fruit to retain the flow of the fruit under the pressure of the fruit sliding down the chute.

MAXIMILIAN KOFFLER.

REFERENCES CITED

The following references are of record in the file of this patent:

UNITED STATES PATENTS

| Number | Name | Date |
| --- | --- | --- |
| 2,115,110 | Keil | Apr. 26, 1938 |
| 2,134,608 | Hawkins | Oct. 25, 1938 |
| 2,139,180 | Urschel | Dec. 6, 1938 |
| 2,178,007 | Thompson | Oct. 31, 1939 |
| 2,316,368 | Sells | Apr. 13, 1943 |
| 2,335,164 | Wayland | Nov. 23, 1943 |

FOREIGN PATENTS

| Number | Country | Date |
| --- | --- | --- |
| 118,279 | Australia | Mar. 30, 1944 |
| 591,022 | Germany | Jan. 15, 1934 |